(12) United States Patent
Tanabe et al.

(10) Patent No.: US 10,695,999 B2
(45) Date of Patent: Jun. 30, 2020

(54) SHOE MEMBER, SHOE, AND METHOD FOR PRODUCING THE SAME

(71) Applicant: ASICS Corporation, Kobe-shi (JP)

(72) Inventors: Tatsuro Tanabe, Kobe (JP); Shintaro Nagata, Kobe (JP)

(73) Assignee: ASICS CORPORATION (JP)

( * ) Notice: Subject to any disclaimer, the term of this patent is extended or adjusted under 35 U.S.C. 154(b) by 101 days.

(21) Appl. No.: 16/066,668

(22) PCT Filed: Dec. 28, 2016

(86) PCT No.: PCT/JP2016/089062
§ 371 (c)(1),
(2) Date: Jun. 27, 2018

(87) PCT Pub. No.: WO2017/115840
PCT Pub. Date: Jul. 6, 2017

(65) Prior Publication Data
US 2019/0016079 A1 Jan. 17, 2019

Related U.S. Application Data

(63) Continuation of application No. PCT/JP2015/086508, filed on Dec. 28, 2015.

(51) Int. Cl.
*A43B 13/12* (2006.01)
*B29D 35/12* (2010.01)
(Continued)

(52) U.S. Cl.
CPC ............. *B29D 35/12* (2013.01); *A43B 5/00* (2013.01); *A43B 13/00* (2013.01); *A43B 13/02* (2013.01);
(Continued)

(58) Field of Classification Search
CPC ......... A43B 13/00; A43B 13/02; A43B 13/04; A43B 13/12; A43B 5/00
(Continued)

(56) References Cited

U.S. PATENT DOCUMENTS 3,613,272 A * 10/1971 Fukuoka ................ A43B 13/12
36/91
4,561,140 A * 12/1985 Graham ................... A43B 5/06
12/142 RS
(Continued)

FOREIGN PATENT DOCUMENTS

JP S61-154503 A 7/1986
JP S62-213701 A 9/1987
(Continued)

OTHER PUBLICATIONS

International Search Report for International Application No. PCT/JP2016/089062 dated Apr. 4, 2017.
(Continued)

*Primary Examiner* — Marie D Bays
(74) *Attorney, Agent, or Firm* — Katten Muchin Rosenman LLP (57) ABSTRACT

Provided is a shoe member constituting a part of a shoe, including an injection molded article that includes an inner member and an outer member partially or fully enclosing the inner member, wherein the inner member and the outer member are each formed from a resin composition containing a thermoplastic resin, a shoe including the shoe member, and a method for producing the shoe member.

10 Claims, 5 Drawing Sheets

(51) Int. Cl.
*B29D 35/04* (2010.01)
*A43C 15/02* (2006.01)
*A43B 13/00* (2006.01)
*A43B 13/02* (2006.01)
*A43B 5/00* (2006.01)
*B29D 35/00* (2010.01)
*A43B 13/04* (2006.01)

(52) U.S. Cl.
CPC .............. *A43B 13/12* (2013.01); *A43C 15/02* (2013.01); *B29D 35/0009* (2013.01); *B29D 35/04* (2013.01); *B29D 35/122* (2013.01); *A43B 13/04* (2013.01); *C08J 2300/22* (2013.01)

(58) Field of Classification Search
USPC ................ 36/87, 25 R, 30 R, 30 A, 31, 134
See application file for complete search history.

(56) References Cited

U.S. PATENT DOCUMENTS

| | | | | |
|---|---|---|---|---|
| 4,614,046 A * | 9/1986 | Dassler | .................... | A43B 5/06 36/30 R |
| 4,654,983 A * | 4/1987 | Graham | .................... | A43B 5/06 36/114 |
| 5,077,916 A * | 1/1992 | Beneteau | ............. | A43B 13/184 361/114 |
| 5,572,805 A * | 11/1996 | Giese | ...................... | A43B 13/12 36/103 |
| 5,987,782 A * | 11/1999 | Bramani | ............... | A43B 3/0057 36/107 |
| 6,199,303 B1 * | 3/2001 | Luthi | ...................... | A43B 7/142 36/107 |
| 6,598,319 B2 * | 7/2003 | Hardt | ...................... | A43B 7/142 36/153 |
| 6,713,006 B1 * | 3/2004 | Redin Gorraiz | ..... | A43B 13/026 264/154 |
| 6,954,998 B1 * | 10/2005 | Lussier | .................... | A43B 5/02 36/107 |
| 7,313,876 B2 * | 1/2008 | Morgan | ............... | A43B 1/0027 36/59 R |
| 7,418,791 B2 * | 9/2008 | Cole, III | .............. | A43B 7/1415 36/25 R |
| 7,421,808 B2 * | 9/2008 | Baier | ...................... | A43B 13/12 36/107 |
| 7,941,938 B2 * | 5/2011 | Yu | ......................... | A43B 7/1415 36/25 R |
| 8,621,765 B2 * | 1/2014 | Geer | ....................... | A43B 9/06 36/12 |
| 9,289,029 B2 * | 3/2016 | Miette | .................. | A43B 5/0411 |
| 9,615,621 B2 * | 4/2017 | Foxen | ..................... | A43B 5/02 |
| 9,883,714 B2 * | 2/2018 | Cavaliere | ............. | A43B 13/122 |
| 10,206,451 B2 * | 2/2019 | Bird | ....................... | A43B 13/12 |
| 10,420,392 B2 * | 9/2019 | Foxen | ................... | A43B 13/14 |
| 2003/0140522 A1 * | 7/2003 | Liu | ....................... | B29D 35/062 36/12 |
| 2004/0148809 A1 | 8/2004 | Kikuta et al. | | |
| 2004/0205981 A1 * | 10/2004 | Cole | ...................... | A43B 7/1415 36/30 R |
| 2005/0048236 A1 * | 3/2005 | Watkins | ............... | A43B 13/206 428/35.7 |
| 2008/0229625 A1 * | 9/2008 | Frasson | .................. | A43B 13/24 36/59 C |
| 2009/0105417 A1 * | 4/2009 | Walton | .................... | C08F 10/00 525/88 |
| 2012/0028047 A1 * | 2/2012 | Imai | ........................ | C08J 5/04 428/403 |
| 2013/0318831 A1 * | 12/2013 | Foxen | ..................... | A43B 5/02 36/25 R |
| 2014/0366402 A1 * | 12/2014 | Cavaliere | ............... | A43B 13/02 36/25 R |
| 2019/0357631 A1 * | 11/2019 | Foxen | ..................... | A43B 5/06 |

FOREIGN PATENT DOCUMENTS

| | | |
|---|---|---|
| JP | H09-206102 A | 8/1997 |
| JP | 3392395 B | 3/2003 |
| JP | 2004-237090 A | 8/2004 |
| JP | 3757238 B | 3/2006 |
| JP | 5631689 B | 11/2014 |

OTHER PUBLICATIONS

International Preliminary Report on Patentability for International Application No. PCT/JP2016/089062.

* cited by examiner

SHOE MEMBER, SHOE, AND METHOD FOR PRODUCING THE SAME

CROSS-REFERENCE TO RELATED APPLICATION

This application claims priority to International Patent Application No. PCT/JP2015/086508, the disclosure of which is incorporated herein by reference in its entirety.

FIELD

The present invention relates to a shoe member, a shoe, and a method for producing the same, more specifically, to a shoe member including an injection molded article; a shoe including the shoe member, and a method for producing the shoe member.

BACKGROUND

Generally, shoes are constructed by various shoe members such as upper materials, soles, and counters. In many cases, a plurality of different members are used in combination for the shoe members. Such shoe members can have various textures derived from the combinations of the color tones or mechanical properties of the respective members.

As such a shoe member in which a plurality of different members are used in combination, for example, a cycling shoe sole disclosed in Patent Literature 1 is known. In the cycling shoe sole, a cavity surrounded by a plurality of carbon fiber layers and/or glass fiber layers laid on each other is filled with a core material.

However, in order to produce the cycling shoe sole of Patent Literature 1, glass fiber layers or carbon fiber layers impregnated with a resin need to be wound around a core material after producing the core material, further followed by heating or pressurizing. Therefore, the shoe sole of Patent Literature 1 has a problem where the production process is complicated.

CITATION LIST

Patent Literature

Patent Literature 1: JP 2004-237090 A

SUMMARY

Technical Problem

In view of the aforementioned problem, it is an object of the present invention to provide a shoe member that has various textures derived from a plurality of members and can be produced easily, a shoe including the shoe member, and a method for producing the shoe member.

Solution to Problem

A shoe member according to the present invention is a shoe member constituting a part of a shoe, the shoe member including: an injection molded article that includes an inner member and an outer member partially or fully enclosing the inner member, wherein the inner member and the outer member are each formed from a resin composition containing a thermoplastic resin.

A shoe according to the present invention is a shoe including the shoe member.

A method for producing a shoe member according to the present invention is a method for producing a shoe member constituting a part of a shoe, the shoe member including a composite that includes an inner member and an outer member partially or hilly enclosing the inner member, the method including producing the composite by injection molding.

DESCRIPTION OF EMBODIMENTS

First Embodiment

A shoe member of the present invention is a member constituting a part of a shoe. Hereinafter, an embodiment of a shoe sole member as the shoe member of the present invention and an embodiment of a shoe including the shoe sole member will be described with reference to FIG. 1 to FIG. 3. The following embodiments are shown merely as examples. The present invention is not limited to the following embodiments at all.

Figure 1:
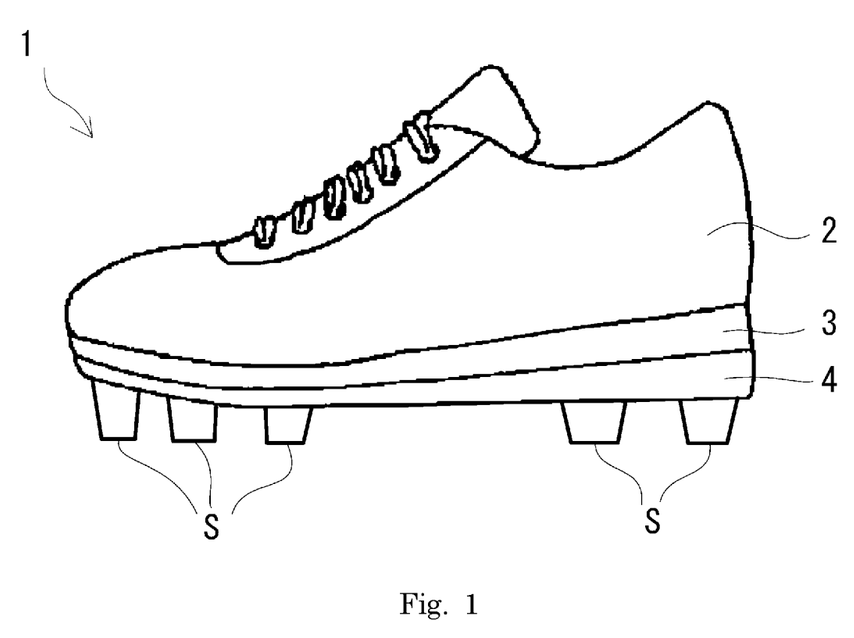
FIG. 1 is a schematic view showing a shoe formed by using a shoe sole member that is a shoe member of an embodiment.

FIG. 1 shows a shoe 1 including shoe sole members as shoe members of this embodiment. The shoe 1 has an upper material 2 covering the upper surface of a foot and shoe sole members 3 and 4 arranged below the upper material 2 to form the shoe sole. The shoe 1 has an outer sole 4 arranged at a position that contacts the ground and a midsole 3 arranged above the outer sole 4 as the shoe sole members. The shoe 1 is a spiked shoe in which the outer sole 4 includes a plurality of spike parts S projecting downwardly. More specifically the shoe 1 is a spiked shoe for soccer.

Figure 2:
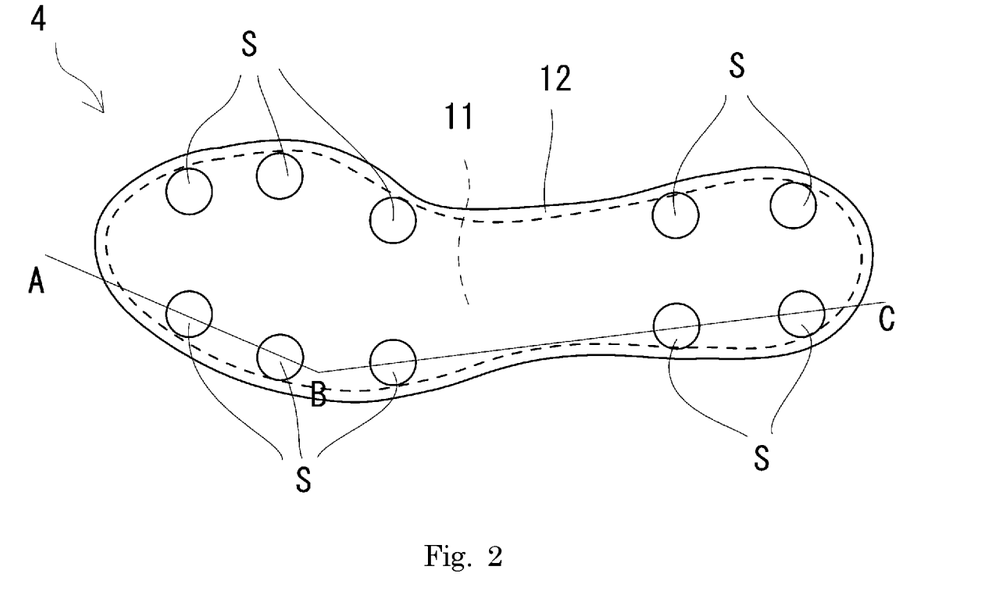
FIG. 2 is a schematic bottom view showing a shoe sole member of a first embodiment.
Figure 3:
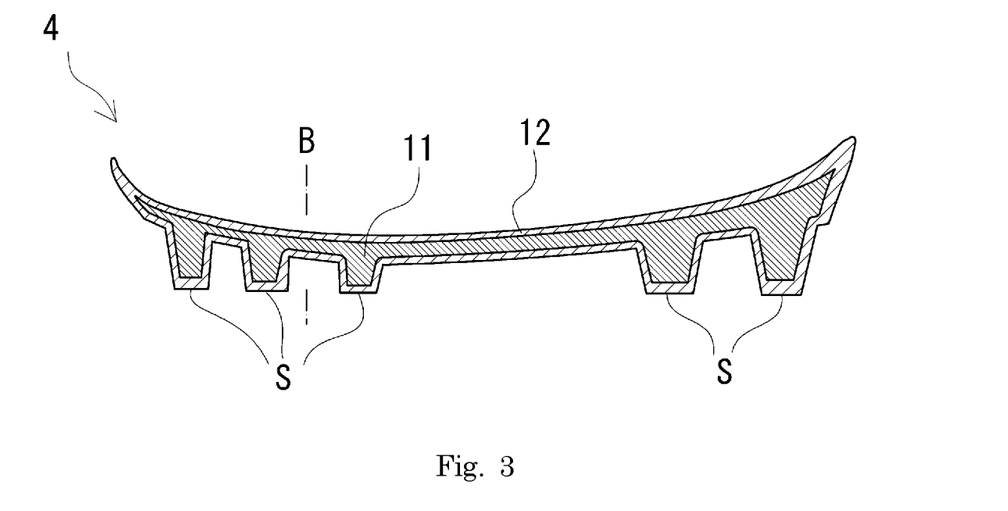
FIG. 3 is a sectional view, taken along the combined lines A-B-C, of the shoe sole member in FIG. 2.

FIG. 2 and FIG. 3 show the outer sole 4 as a shoe sole member of this embodiment. The outer sole 4 is an injection molded article including an inner member 11 and an outer member 12 enclosing the entire inner member 11. Since the outer sole 4 of this embodiment is configured as described above, the outer sole 4 can have various textures derived from the inner member 11 and the outer member 12 by imparting different color tones or mechanical properties respectively to the inner member 11 and the outer member 12.

In this description, the state where the outer member encloses the entire inner member indicates the state where the entire inner member is held inside an area surrounded by the outer member. That is, the entire inner member may be covered by the outer member, but the surface of the inner member may be partially not covered by the outer member, as long as the inner member does not protrude outside the area surrounded by the outer member. For example, the inner member may be enclosed inside the outer member having a mesh form. In the case where the outer member encloses the entire inner member as in the outer sole 4 of this embodiment, the outer member 12 preferably covers 60% or more, more preferably 80% or more, of the surface of the inner member 11.

Further, since the outer sole 4 is an injection molded article produced by injection molding, the inner member 11 and the outer member 12 have a continuous integrated structure without joined portions.

The inner member 11 and the outer member 12 are formed from resin compositions containing thermoplastic resins. Therefore, the outer sole 4 of this embodiment configured as above can be easily obtained by injection molding.

The thermoplastic resins that are the main components of the resin compositions forming the inner member 11 and the outer member 12 may be any type of thermoplastic resins commonly used for shoe members. As the thermoplastic resins, olefin resins including polyethylene (such as linear low density polyethylene (LLDPE) and high density polyethylene (HDPE)), polypropylene, ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-butene copolymers (EBM), 1-butene-1-hexene copolymers, 1-butene-4-methyl-pentene, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, ethylene-vinyl acetate copolymers (EVA), or propylene-vinyl acetate copolymers, for example, can be employed.

Further, as the thermoplastic resins, resins other than olefin resins including styrene polymers such as styrene-ethylene-butylene copolymers (SEB), styrene-butadiene-styrene copolymers (SBS), hydrogenated SBS (styrene-ethylene-butylene-styrene copolymers (SEBS)), styrene-isoprene-styrene copolymers (SIS), hydrogenated SIS (styrene-ethylene-propylene-styrene copolymers (SEPS)), styrene-isobutylene-styrene copolymers (SIBS), styrene-butadiene-styrene-butadiene (SBSB), styrene-butadiene-styrene-butadiene-styrene (SBSBS), polystyrene, acrylonitrile styrene resins (AS resins), acrylonitrile butadiene styrene resins (ABS resins), and styrene-based thermoplastic elastomers (TPS); or urethane polymers such as urethane-based thermoplastic elastomers (TPU), for example, can be employed.

Further, as the thermoplastic resins, fluorine-containing polymers such as fluororesin and fluororubber; polyamide polymers including polyamide resins such as polyamide 6, polyamide 11, polyamide 12, polyamide 6,6, and polyamide 610, and polyamide elastomers; polyester resins such as polyethylene terephthalate and polybutylene terephthalate; polyvinyl chloride resins; acrylic resins such as polymethylmethacrylate; butadiene rubber (BR); isoprene rubber (IR); chloroprene (CR); natural rubber (NR); styrene butadiene rubber (SBR); acrylonitrile butadiene rubber (NBR); or butyl rubber (IIR), for example, can be employed.

The resin compositions may contain one or a plurality of types of thermoplastic resins.

Preferably, the thermoplastic resins that serve as the main components of the resin compositions forming the inner member 11 and the outer member 12 are olefin resins, polyamide resins, urethane resins, or styrene resins. Olefin resins have a property of being comparatively lightweight. Therefore, in the case where the thermoplastic resins are olefin resins, the weight of the outer sole 4 can be reduced. Although it is difficult to bond the olefin resins directly to other resins such as polyamide resins, urethane resins, and styrene resins, the olefin resins can be used in combination with these resins in the outer sole 4 of this embodiment, as described below. Polyamide resins have a property of having comparatively high rigidity. Therefore, in the case where the thermoplastic resins are polyamide resins, the rigidity of the outer sole 4 can be enhanced. Urethane resins have a property of being comparatively excellent in abrasion resistance. Therefore, in the case where the thermoplastic resins are urethane resins, the abrasion resistance of the outer sole 4 can be enhanced. Styrene resins have a property of being comparatively flexible. Therefore, in the case where the thermoplastic resins are styrene resins, the flexibility of the outer sole 4 can be enhanced.

More preferably, the thermoplastic resin that is the main component of the resin composition forming the inner member 11 may be an olefin resin or a polyamide resin, and the thermoplastic resin that is the main component of the resin composition forming the outer member 12 is a urethane resin or a styrene resin.

The inner member 11 and the outer member 12 may be formed from resin compositions mainly containing the same thermoplastic resin or may be formed from resin compositions mainly containing different thermoplastic resins.

Preferably, the inner member 11 and the outer member 12 are formed from resin compositions mainly containing different thermoplastic resins. In such a case, various mechanical properties derived from both of the inner member 11 and the outer member 12 can be imparted to the outer sole 4 by applying combinations of various thermoplastic resins to the inner member 11 and the outer member 12. For example, by using a polyamide resin or an olefin resin as the main component of the resin composition forming the inner member 11 and using a urethane resin or a styrene resin as the main component of the resin composition forming the outer member 12, the outer sole 4 having high rigidity or lightweight properties that are the physical properties of the inner member 11 and having high abrasion resistance or flexibility that are the physical properties of the outer member 12 can be provided.

Here, in the case where the elastic modulus (Young's modulus) of the resin composition forming the outer member 12 is higher than the elastic modulus of the resin composition forming the inner member 11, the inner member 11 is independent so as not to deform when the outer sole 4 deforms due to external forces, so that the deformation of the inner member 11 is controlled by the deformation of the outer member 12 enclosing the entire inner member 11. Therefore, the deformation of the outer sole 4 due to external forces can be reduced. This is particularly advantageous in the case where the outer sole 4 of this embodiment is compared with a conventional shoe sole member with a configuration in which two resin compositions having different elastic moduli are layered substantially parallel to the ground. In this case, the outer sole 4 deforms less, particularly, in the lateral direction due to external forces, as compared with the conventional shoe sole member.

In this embodiment, the inner member 11 extends to the inside of the spike parts S. Therefore, the mechanical properties derived from both of the inner member 11 and the outer member 12 can be imparted also to the spike parts S of the outer sole 4.

The outer sole 4 including the inner member 11 and the outer member 12 of this embodiment is an injection molded article. Therefore, it is possible to provide a shoe member having a combination of an inner member and an outer member that has been impossible to be provided conventionally.

Specifically, it is known that, in the case where the difference in SP value (solubility parameter) between two thermoplastic resins is 1.0 or more, the adhesion between these thermoplastic resins is low, and it is difficult to bond the resins directly to each other. Therefore, in conventional methods for producing a shoe member including overmolding, it has been impossible to bond such resins directly to each other without using adhesives and hence integrally form them as a single shoe member. In contrast, the outer sole 4 of this embodiment is an injection molded article produced by two-component injection molding. Therefore, in the outer sole 4, even in the case where the difference in SP value between the thermoplastic resin contained in the inner member 11 and the thermoplastic resin contained in the outer member 12 is 1.0 or more, these two resins are melted and mixed at the interface during injection molding. This enables the inner member 11 and the outer member 12 to be directly bonded firmly via the interface where the two are mixed. Meanwhile, in conventional methods for producing a shoe member including overmolding, another resin that serves as the outer member is injected into a resin that serves as the inner member after curing or after foaming, and therefore the resin only on the surface of the inner member melts and adheres to the resin of the outer member but does not adhere as firmly as in the present invention.

Preferably, the difference in SR value between the thermoplastic resin contained in the inner member 11 and the thermoplastic resin contained in the outer member 12 may be 1.2 or more, more preferably 1.5 or more, further preferably in the range of 1.5 to 3.0.

Further, the outer sole 4 of this embodiment has properties that, even in the case where the difference in SP value between the thermoplastic resin contained in the inner member 11 and the thermoplastic resin contained in the outer member 12 is less than 1.0, the adhesion between the two is stronger than in the conventional shoe member.

In this description, the SP value refers to a value defined by Hildebrand's regular solution theory.

Further, since the outer sole 4 of the present invention is an injection molded article produced by injection molding, it is also possible to provide the outer sole 4 in which the inner member 11 is physically fixed to the inside of the outer member 12 due to the three-dimensional shape of the outer member 12. In this case, if the outer sole 4 has a structure in which the inner member 11 is enclosed in the outer member 12, the inner member 11 and the outer member 12 are not necessarily bonded to each other.

The inner member 11 and the outer member 12 may be formed from resin compositions having different colors or textures from each other. In such a case, a unique color or texture can be imparted to the outer sole 4 by selecting a combination of colors or textures of the resin compositions forming the inner member 11 and the outer member 12, so that the outer sole 4 having excellent aesthetic appearance can be provided. At this time, the outer member 12 may be formed from a highly transparent resin composition so that the color or the like of the inner member 11 can be visually recognized from the outside. In such a case, the transparency of the resin composition forming the outer member 12 is preferably 70% or more, as a transmittance of visible light defined in ASTM D 1746.

The inner member 11 and the outer member 12 may be shock absorbers. In such a case, shock absorbing properties can be imparted to the inner member 11 and the outer member 12. In particular, it is preferable that the inner member 11 be a shock absorber, and the outer member 12 not be a shock absorber. In such a case, the inner member 11 that is a shock absorber is enclosed in the outer member 12 that is not a shock absorber, and therefore the shock absorber does not contact the ground during use of the shoe 1 including the outer sole 4. Therefore, the shock absorbing properties of the outer sole 4 can be enhanced without the influence of the low abrasion resistance of the shock absorber constituting the inner member 11. Further, the configuration in which the inner member 11 that is a shock absorber is arranged within the outer sole 4 while being enclosed in the outer member 12 that is not a shock absorber is advantageous also in that there is no need to separately coat the shock absorber.

In this description, the shock absorber is a member in which the maximum value of negative acceleration applied to a 10-kg spherical weight when the weight is allowed to fall freely from a position 50 mm above the member formed from a resin composition so as to collide with the member at 25° C. falls within the range of 5 to 20 G at a thickness of 20 mm. Preferably, the maximum value of negative acceleration applied to the weight falls within the range of 8 to 17 G. The maximum value of negative acceleration can be measured as follows. First, a circular member with a diameter of 50 mm and thickness of 20 mm formed from a resin composition is placed on a horizontal table (material: iron). Thereafter, the maximum value of negative acceleration applied to a spherical weight (mass: 10 kg, material: iron) when the weight is allowed to fall freely from a position 50 mm above the member so as to collide with the member at 25° C. is measured.

Further, in the case where the inner member 11 is a shock absorber, the shock absorber may be a polymer gel obtained by gelation of a resin composition. The polymer gel, for example, has an elastic modulus (Young's modulus) of 50 MPa or less, preferably 10 MPa or less, more preferably 5 MPa or less. In such a case, the shock absorbing properties of the outer sole 4 including the inner member 11 can be enhanced more effectively. It has been difficult to produce such a shoe member enclosing an inner member composed of a polymer gel by overmolding that can be commonly used for shoe members. In contrast, since the outer sole 4 of this embodiment is an injection molded article produced by injection molding using the later-described methods or the like, this embodiment can easily provide the outer sole 4 in which the inner member 11 composed of a polymer gel is enclosed in the outer member 12 while being bonded thereto. In this description, the elastic modulus (Young's modulus) of a resin composition refers to a tensile elastic modulus at 25° C. measured based on JIS K7161 (ISO 527-1).

One or both of the inner member 11 and the outer member 12 may be non-foamed products in which resin compositions are not foamed. Generally, non-foamed products have high rigidity and small deformation due to external forces as compared with foam products. Therefore, the outer sole 4 in which one or both of the inner member 11 and the outer member 12 are non-foamed products has an advantage that deformation due to external forces is comparatively small. Further, since non-foamed products have high abrasion resistance as compared with foam products, there is also an advantage that the abrasion resistance of the outer sole 4 is comparatively high in the case where the outer member 12 is a non-foamed product.

Further, one or both of the inner member 11 and the outer member 12 may be foam products in which resin compositions are foamed. Since foam products have excellent shock absorbing properties, shock absorbing properties can be imparted to one or both of the inner member 11 and the outer member 12 by using foam products as resin compositions. Further, since foam products are remarkably lightweight as compared with non-foamed products, the weight of the outer sole 4 can be considerably reduced by using foam products as the one or both of the inner member 11 and the outer member 12. In such a case, it is preferable that the inner member 11 be a foam product, and the outer member 12 be a non-foamed product. In such a case, since the inner member 11 that is a foam product is enclosed in the outer member 12 that is a non-foamed product, the foam product does not contact the ground during use of the shoe 1 including the outer sole 4. Therefore, the lightweight properties and the shock absorbing properties of the outer sole 4 can be enhanced without the influence of the low abrasion resistance of the foam product constituting the inner member 11.

The ratio of the inner member 11 with respect to the outer member 12 in the outer sole 4 is not specifically limited, but the volume of the inner member 11 contained in the outer sole 4 is preferably 0.1 to 2.0 times the volume of the outer member 12, for example.

Since the outer sole 4 of this embodiment is an injection molded article produced by two-component injection molding, the inner member 11 and the outer member 12 are directly bonded to each other via the interface at which the two are compatibilized. Thereby, the inner member 11 and the outer member 12 are comparatively firmly bonded to each other as compared with bonding by overmolding that can be commonly used for shoe members. In common bonding by overmolding, the inner member and the outer member can possibly separate from the interface when a force in a direction separating the members is applied around the bonding interface between the inner member and the outer member. In contrast, in the outer sole 4 of this embodiment where the inner member 11 and the outer member 12 are firmly bonded together, the inner member 11 and the outer member 12 does not separate from the interface upon application of such a force, but cohesive failure occurs in shock absorbers constituting one or both of the inner member 11 and the outer member 12, so that the bonding state between the inner member 11 and the outer member 12 remains at the interface (for example, at least about 10% of the overall area of the interface).

Subsequently, a method for producing the outer sole 4 of this embodiment will be described.

The outer sole 4 of this embodiment can be fabricated, for example, by continuously injecting a resin composition for the inner member 11 and a resin composition for the outer member 12 into a forming mold having a cavity corresponding to the shape of the outer sole 4 through the following steps, using a two-component injection molding machine that includes: a nozzle configured to introduce each of the resin composition for the inner member 11 and the resin composition for the outer member 12 into the cavity; and first and second cylinders respectively in which the resin compositions are melt-kneaded so as to be fed to the nozzle, and that is configured so that the resins inside the first and second cylinders join together before the nozzle.

(a) A step of heating each of the resin composition for the inner member 11 and the resin composition for the outer member 12 in the aforementioned two-component injection molding machine into a molten state.

(b) A step of feeding the resin composition for the outer member 12 into the forming mold from the first cylinder through the nozzle in an amount smaller than the capacity of the cavity and stopping the feeding of the resin composition in the state where excess space is present in the forming mold.

(c) A step of feeding the resin composition for the inner member 11 into the forming mold from the second cylinder through the nozzle while at least a part of the resin composition for the outer member 12 fed into the forming mold in step (b) is still in the molten state and stopping the feeding of the resin composition in the state where excess space is present in the forming mold. (d) A step of feeding the resin composition for the outer member 12 into the forming mold from the first cylinder through the nozzle while at least a part of the resin composition for the inner member 11 fed into the forming mold in step (c) is still in the molten state and filling the space remaining in the forming mold with the resin composition for the outer member 12.

The outer sole 4 in which the inner member 11 is enclosed in the outer member 12 while being bonded thereto can be easily formed by injection molding by carrying out steps (a) to (d) above.

The ratio of the weight of the resin composition for the outer member 12 used in step (b) above with respect to the weight of the resin composition for the outer member 12 used in step (d) above is in the range of 5:5 to 9:1, preferably in the range of 6:4 to 8:2.

In the case of producing the outer sole 4 having the inner member 11 and the outer member 12 that are foam products, foaming agents may be mixed with the resin compositions that are materials forming the foam products in advance, and the resin compositions may be foamed in the first and second cylinders by heating of the resin compositions, for example. The foaming agents are not specifically limited but may be, for example, chemical foaming agents or physical foaming agents. The chemical foaming agents are foaming agents that generate gases by chemical reaction or pyrolysis. Examples of the chemical foaming agents include inorganic chemical foaming agents such as sodium bicarbonate and ammonium carbonate, and organic chemical foaming agents such as azodicarbonamide. The physical foaming agents are liquefied gases, supercritical fluids, or the like, and are configured to foam by pressure reduction or heating. Examples of the physical foaming agents include aliphatic hydrocarbons such as butane, alicyclic hydrocarbons such as cyclobutane, and inorganic gases such as carbon dioxide gas, nitrogen, and air.

Second Embodiment

The outer sole 4 that is the shoe sole member of the first embodiment is an injection molded article in which the entire inner member 11 is enclosed in the outer member 12, but only a part of the inner member may be enclosed in the outer member in the shoe member of the present invention. Hereinafter, a shoe sole member according to a second embodiment having such a configuration will be described with reference to FIG. 4 and FIG. 5. The same or corresponding members as in the first embodiment are denoted by the same reference numerals, and the descriptions thereof are not repeated.

Figure 4:
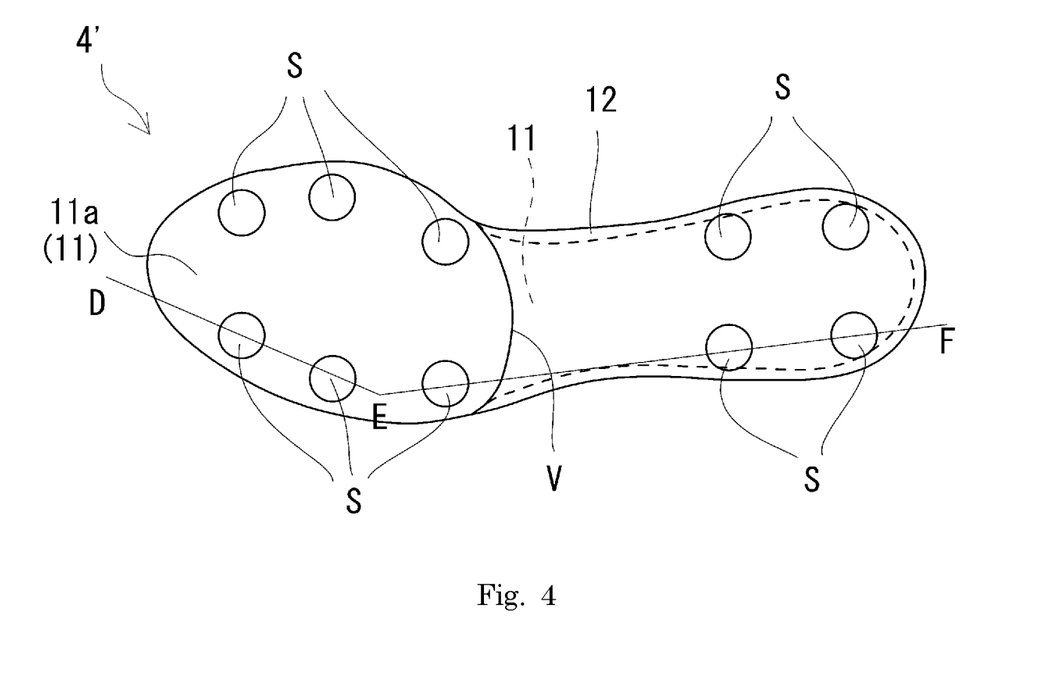
FIG. 4 is a schematic bottom view showing a shoe sole member of a second embodiment.
Figure 5:
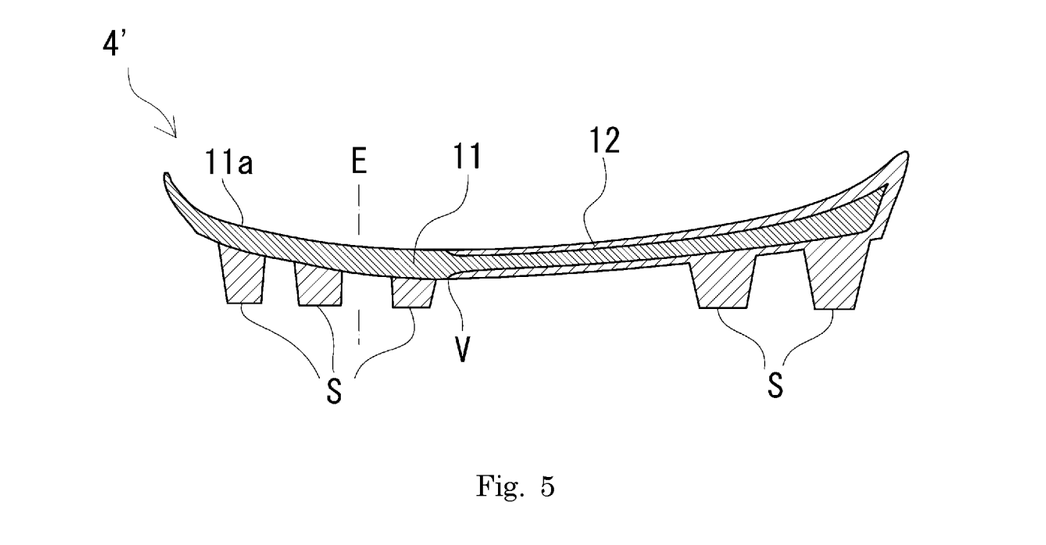
FIG. 5 is a sectional view; taken along the combined lines D-E-F, of the shoe sole member in FIG. 4.

As shown in FIG. 4 and FIG. 5, an outer sole 4' of this embodiment has a configuration in which the outer member 12 is in the form of a bag having an opening, and the inner member 11 extends to the outside of the outer member 12 through the opening. More specifically, the outer member 12 opens toward the forefoot side of the outer sole 4', and the inner member 11 extends in the forefoot portion of the outer sole 4'.

Since the outer sole 4' of this embodiment has the aforementioned configuration, the inner member 11 is exposed on the surface of the outer sole 4' in an extending portion 11a in which the inner member 11 extends over the outer member 12. Therefore, the outer sole 4' can extract features of the inner member 11 more effectively in the extending portion 11a.

In addition, in the outer sole 4', the inner member and the outer member are smoothly joined at a boundary V between the extending portion 11a of the inner member 11 exposed on the surface of the outer sole 4' and the outer member 12 (that is, the tip of the opening of the outer member 12). Therefore, even in the case where there is a difference in rigidity between the resin compositions forming the inner member 11 and the outer member 12, there is no sudden step in rigidity at the interface. Therefore, the outer sole 4' can exhibit a continuous distribution of deformation due to external forces. In addition, the outer sole 4' also has a feature that cracking or separation is less likely to occur at the boundary V between the inner member 11 and the outer member 12.

In the case where a part of the inner member 11 is enclosed in the outer member 12, as in the outer sole 4' of this embodiment, the outer member 12 preferably covers 30% or more and less than 100%, more preferably 50% or more and less than 100%, of the surface of the inner member 11.

In this embodiment, in order to make cracking or separation at the boundary V between the inner member 11 and the outer member 12 further less likely to occur, the inner member 11 and the outer member 12 are preferably formed respectively from resin compositions mainly containing thermoplastic resins that have high compatibility. Specifically, the difference in SIP value between the thermoplastic resin contained in the inner member 11 and the thermoplastic resin contained in the outer member 12 is preferably 1.0 or less.

The resin composition forming the inner member 11 preferably has a smaller viscosity at 200° C. than the resin composition forming the outer member 12. In such a case, the outer sole 4' in which the inner member 11 extends over the outer member 12 can be obtained further easily.

In the outer sole 4', the outer member 12 includes one opening as an outlet through which the inner member 11 extends from the outer member 12, but the shoe member of the present invention may include two or more openings as above.

Further, in the outer sole 4' of this embodiment, the inner member 11 is not contained inside the spike parts S. In such a case, in the spike parts 5, the features of the outer member 12 can be extracted effectively without the influence of the inner member 11.

The ratio of the weight of the resin composition for the outer member 12 used in step (b) above with respect to the weight of the resin composition for the outer member 12 used in step (d) above is in the range of 5:5 to 9:1, preferably in the range of 6:4 to 8:2.

Further, during injection of the resin composition for the inner member 11 and the resin composition for the outer member 12 into the mold, the orientation of the mold is preferably adjusted so that the part of the inner member 11 to be enclosed in the outer member 12 is formed near the injection port, and the part of the inner member 11 extending from the outer member 12 is formed away from the injection port.

The shoe member according to the present invention is not limited to the aforementioned embodiments, and various modifications can be made without departing from the gist of the present invention. Further, it is a matter of course that the configurations, methods, or the like according to the following various modifications may be optionally selected to be employed in the configurations, methods, or the like according to the aforementioned embodiments.

For example, in the outer soles 4 and 4' of the aforementioned embodiments, the inner member 11 is enclosed throughout the outer member 12, but the shoe member of the present invention may include a portion composed only of the outer member in which the inner member is not included. For example, as in an outer sole 4" shown in FIG. 6, the inner member 11 may be not included inside the spike parts S. Further, as in an outer sole 4''' shown in FIG. 7, the inner member 11 may be present only to around the midfoot of the outer sole 4''', so that the forefoot of the outer sole 4''' is composed only of the outer member 12. The shoe member having such a configuration can extract the features of the outer member effectively in the portion composed only of the outer member.

Figure 7:
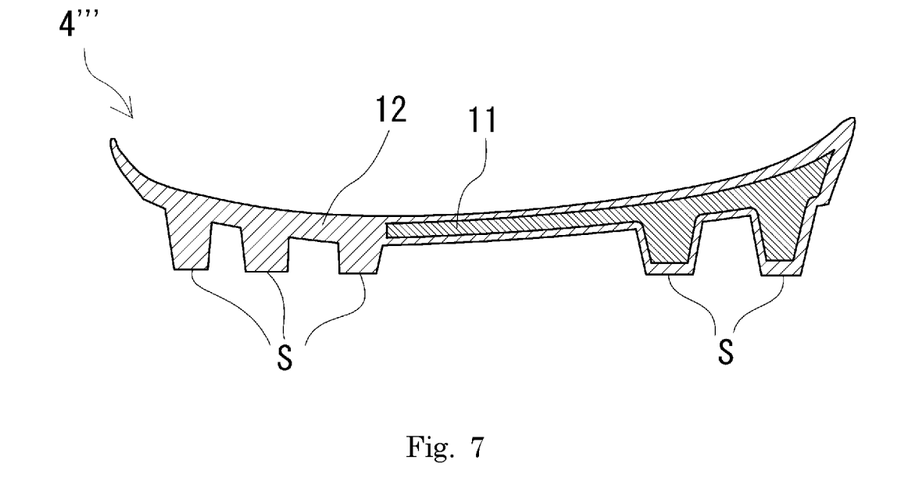
FIG. 7 is a schematic sectional view of a shoe sole member of still another embodiment.

In the case of producing the outer sole 4''' having such a portion in which the inner member is not included, a member fabricated from the resin composition forming the outer member may be inserted into the cavity of the mold in advance, for example, before the injection of the resin composition into the mold. Thereby, the outer sole 4''' including a part in which the inner member is not included can be provided in the portion in which the member has been inserted.

Further, the outer soles 4 and 4' of the aforementioned embodiments are shoe sole members for spiked shoes including the plurality of spike parts S, but the shoe sole members are not necessarily for spiked shoes. The spike parts S are not necessarily included therein. That is, the shoe member of the present invention is not limited to those for spiked shoes and may be members used for running shoes, volleyball shoes, tennis shoes, or the like.

Figure 8:
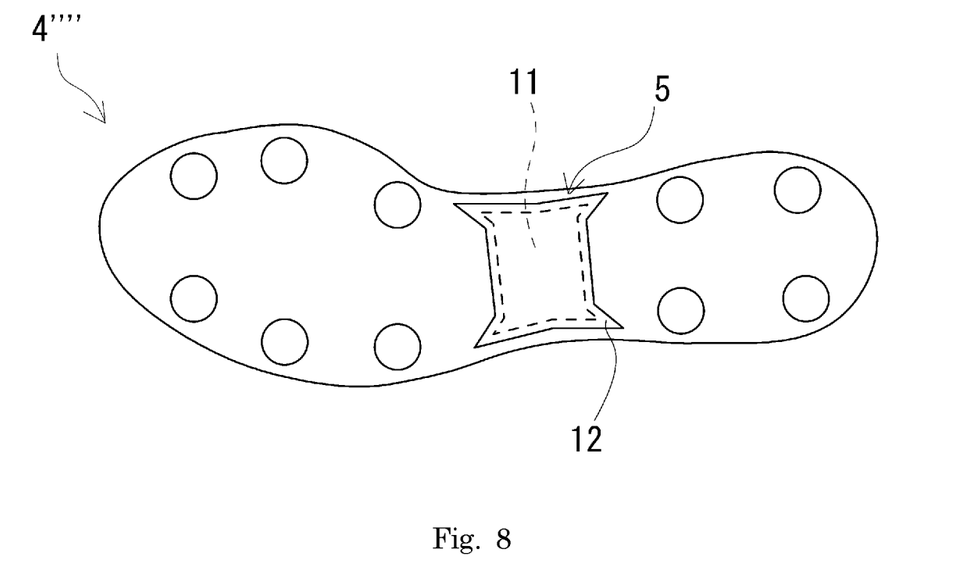
FIG. 8 is a schematic bottom view showing a shoe sole member of another embodiment.
Figure 9:
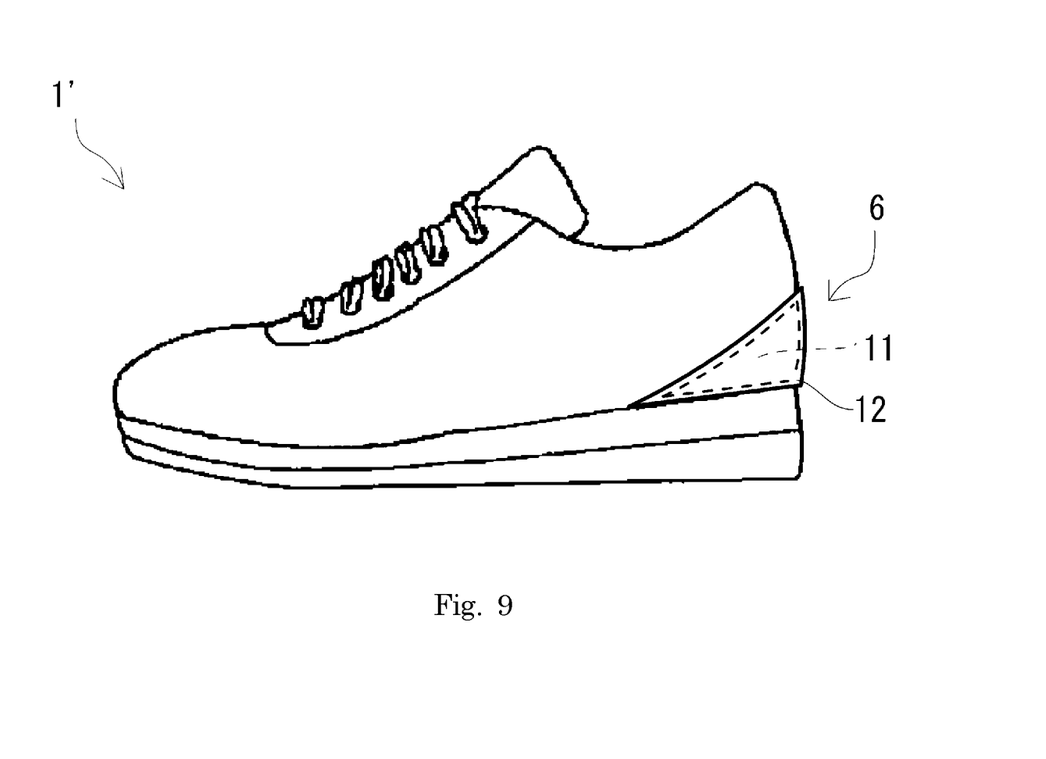
FIG. 9 is a schematic view showing a shoe formed by using a heel counter that is still another shoe member.

Further, in the aforementioned embodiments, the outer soles 4 and 4' that are shoe sole members are described as the shoe member of the present invention, but the present invention is not limited to these members. For example, the shoe sole member according to the present invention is not limited to outer soles and may be midsoles or sock liners. Further, the shoe sole member may be a member arranged only in a part of the shoe sole, not in the entire shoe sole, like a shank 5 arranged in a portion of the outer sole 4'''' shown in FIG. 8 that corresponds to the plantar arch. The member arranged only in a part of the shoe sole may be selectively arranged, for example, in any one or a plurality of points of the forefoot, the midfoot, and the heel of the shoe sole. Further, the shoe member of the present invention is not limited to shoe sole members. The shoe member of the present invention may be a heel counter 6 provided inside or outside the upper material 2 so as to cover the heel, for example, as in a shoe 1' shown in FIG. 9, or may be a toe box of a safety shoe.

EXAMPLES

Hereinafter, the present invention will be clarified by way of specific examples and comparative examples of the present invention. The present invention is not limited to the following examples.

Production of Shoe Sole

Example 1

Using a mold corresponding to a shoe sole member for soccer spiked shoes shown in FIG. 2 (the maximum length: 270 mm, the maximum width: 90 mm, the maximum thickness excluding spike parts: 5 mm, and the height of spike parts: 7 mm) and a commercially available two-component injection molding machine, a shoe sole member for soccer spiked shoes was injection molded, as follows. First, about 50 parts by weight of polyamide ("Pebax5533" manufactured by Arkema S.A., SP value=10.2 to 10.8) as a resin for the inner member and about 50 parts by weight of polyurethane ("ELASTOLLAN 1190" manufactured by BASF Japan Ltd., SP value=10.0 to 11.0) as a resin for the outer member were introduced respectively into the first and second cylinders of the two-component injection molding machine. Next, 70% of the amount of the resin for the outer member introduced into the first cylinder was injected into the mold from the first cylinder at a temperature of 200° C. and an injection speed of 10 mm/second. Subsequently, the full amount of the resin for the inner member introduced into the second cylinder was injected into the mold from the second cylinder at the same temperature and the same injection speed. Subsequently the remaining amount of the resin for the outer member introduced into the first cylinder was injected into the mold at the same temperature and the same injection speed. Thereafter, the mold was cooled at room temperature for 40 seconds, and the mold was then taken out, to obtain a shoe sole member for soccer spiked shoes. As shown in FIG. 2, in the thus obtained shoe sole member, the inner member composed of polyimide having high rigidity was entirely enclosed in the outer member composed of polyurethane having high abrasion resistance. Therefore, the shoe sole member is excellent in both rigidity and abrasion resistance.

Example 2

A shoe sole member for soccer spiked shoes was injection molded in the same manner as in Example 1, except that about 50 parts by weight of polyolefin A ("DF640" manufactured by Mitsui Chemicals, Inc., SP value=7.7 to 8.4) as a resin for the inner member and about 50 parts by weight of polyolefin B ("DF9200" manufactured by Mitsui Chemicals, Inc., SP value=7.7 to 8.4) as a resin for the outer member were used. As shown in FIG. 2, in the thus obtained shoe sole member, the entire inner member composed of the polyolefin A that was lightweight and comparatively hard was enclosed in the outer member composed of the polyolefin B that was lightweight and comparatively flexible. Therefore, the shoe sole member was excellent in both lightweight properties and flexibility.

Example 3

A shoe sole member for soccer spiked shoes was injection molded in the same manner as in Example 1, except that about 50 parts by weight of the polyolefin B ("DF9200" manufactured by Mitsui Chemicals, Inc., SP value=7.7 to 8.4) was used as a resin for the inner member. As shown in FIG. 2, in the thus obtained shoe sole member, the entire inner member composed of the polyolefin B that was lightweight was enclosed in the outer member composed of the polyurethane having high abrasion resistance. Therefore, the shoe sole member was excellent in both lightweight properties and abrasion resistance.

Example 4

A shoe sole member for soccer spiked shoes was injection molded in the same manner as in Example 1, except that about 30 parts by weight of a styrene elastomer ("SEPTON S8007" manufactured by KURARAY CO., LTD., SP value=8.5 to 8.8, styrene content: 30 wt %) as a resin for the inner member and about 70 parts by weight of the polyolefin B ("DF9200" manufactured by Mitsui Chemicals, Inc., SP value=7.7 to 8.4) as a resin for the outer member were used. As shown in FIG. 2, in the thus obtained shoe sole member, the entire inner member composed of the polyurethane gel having cushioning properties was enclosed in the outer member composed of the polyolefin B that was lightweight. Therefore, the shoe sole member was excellent in both cushioning properties and lightweight properties.

Example 5

A shoe sole member for soccer spiked shoes was injection molded in the same manner as in Example 1, except that about 50 parts by weight of polyurethane ("ELASTOLLAN 1190" manufactured by BASF Japan Ltd., SP value=10.0 to 11.0) as a resin for the inner member and about 50 parts by weight of the polyolefin B ("DF9200" manufactured by Mitsui Chemicals, Inc., SP value=7.7 to 8.4) as a resin for the outer member were used, and 1 phr of ADCA (AC #3C, manufactured by EIWA CHEMICAL IND. CO., LTD.) was added as a foaming agent to the resin for the inner member in advance. As shown in FIG. 2, in the thus obtained shoe sole member, the entire inner member composed of a foam product of the polyurethane that had cushioning properties and was lightweight was enclosed in the outer member composed of the polyolefin B that was lightweight. Therefore, the shoe sole member was excellent in both cushioning properties and lightweight properties.

Example 6

Figure 6:
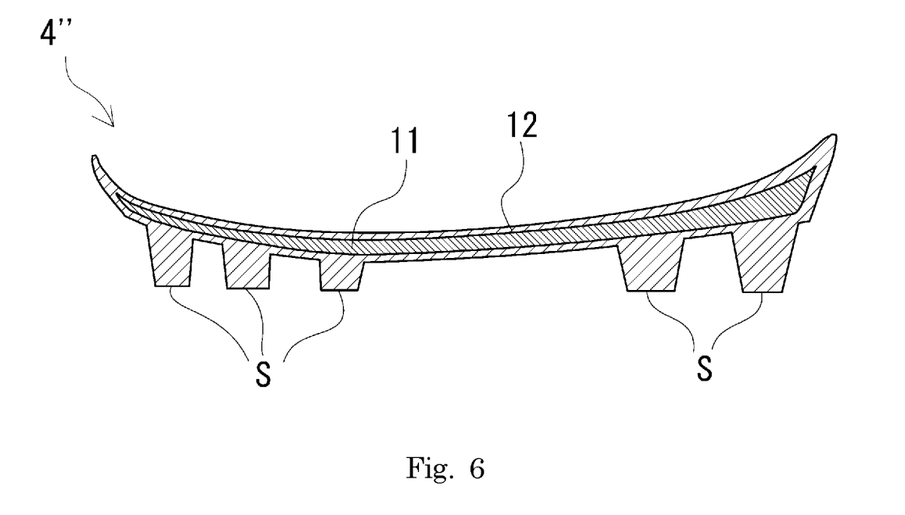
FIG. 6 is a schematic sectional view of a shoe sole member of another embodiment.

Studs made of polyurethane ("ELASTOLLAN 1190" manufactured by BASF Japan Ltd., SP value=10.0 to 11.0) that had been formed in advance were inserted into the spike parts of the same mold as used in Example 1. Using this mold, a shoe sole member for soccer spiked shoes was injection molded in the same manner as in Example 3. As shown in FIG. 6, in the thus obtained shoe sole member, the spike parts were composed only of the polyurethane having high abrasion resistance, and the resin for the inner member was not enclosed. Therefore, the shoe sole member was more excellent in abrasion resistance in the spike parts than the shoe sole member of Example 3.

Example 7

Studs made of polyurethane ("ELASTOLLAN 1190" manufactured by BASF Japan Ltd., SP value=10.0 to 11.0) that had been formed in advance were inserted into the forefoot of the same mold as used in Example 1. Using this mold, a shoe sole member for soccer spiked shoes was injection molded in the same manner as in Example 3. As shown in FIG. 7, in the thus obtained shoe sole member, the forefoot was composed only of the polyurethane having high abrasion resistance, and the resin for the inner member was not enclosed. Therefore, the shoe sole member was more excellent in abrasion resistance in the forefoot than the shoe sole member of Example 3.

Example 8

A shoe sole member for soccer spiked shoes was injection molded in the same manner as in Example 1, except that about 30 parts by weight of the resin for the inner member and about 70 parts by weight of the resin for the outer member were used. In the thus obtained shoe sole member, the volume of the outer member was larger than in the shoe sole member obtained in Example 1. Therefore, the shoe sole member was more excellent in abrasion resistance than the shoe sole member of Example 1.

Example 9

A shoe sole member for soccer spiked shoes was injection molded in the same manner as in Example 1, except that about 70 parts by weight of the resin for the inner member and about 30 parts by weight of the resin for the outer member were used. In the thus obtained shoe sole member, the volume of the inner member was larger than in the shoe sole member obtained in Example 1. Therefore, the shoe sole member had higher rigidity than the shoe sole member of Example 1.

Example 10

A shoe sole member for soccer spiked shoes was injection molded in the same manner as in Example 1, except that about 20 parts by weight of the resin for the inner member and about 80 parts by weight of the resin for the outer member were used, and the temperature during injection was set to 220° C. As shown in FIG. 4, in the thus obtained shoe sole member, the inner member was not covered by the outer member in the forefoot, and the inner member exposed on the surface of the shoe sole member. Therefore, the shoe sole member exerts the rigidity of the polyimide that is the inner member more effectively in the forefoot.

Evaluation of Strength at Interface Between the Inner Member and the Outer Member Preparation of Test Piece Comparative Example 1

Using a mold (having a thickness of 10 mm) having a flat plate shape and the injection molding machine, a flat plate was injection molded as follows. First, a flat plate (having the same thickness as the mold) made of the polyolefin B ("DF9200" manufactured by Mitsui Chemicals, Inc., SP value=7.7 to 8.4) that had been formed in advance was inserted into the mold to about the half from the tip in the length direction. Subsequently, the polyolefin A ("DF640" manufactured by Mitsui Chemicals, Inc., SP value=7.7 to 8.4) was injected into the mold using the injection molding machine. Thereafter, the mold was cooled at room temperature for 40 seconds, and the mold was then taken out, to obtain an injection molded article having a flat plate shape in which a flat plate composed of the polyolefin A was joined to a flat plate composed of the polyolefin B around the center in the length direction. After the molded injection molded product was sliced in the thickness direction into a thickness of 4 mm, a dumbbell test piece (type 5A with the total length of 75 mm and a thickness of 4 mm) defined in ISO 527-2 was cut out. At this time, the dumbbell test piece was cut out so that the interface at which the different resins were joined to each other was located substantially at the center of a narrow parallel portion of the dumbbell test piece.

Comparative Example 2

In the same manner as in Comparative Example 1, after a flat plate (having the same thickness as the mold) made of polyurethane ("ELASTOLLAN 1190" manufactured by BASF Japan Ltd., SP value=10.0 to 11.0) that had been formed in advance was inserted into the mold, the polyolefin B ("DF9200" manufactured by Mitsui Chemicals, Inc., SP value=7.7 to 8.4) was injected into the mold using the injection molding machine. Thereafter, the mold was cooled at room temperature for 40 seconds, and the mold was then taken out. The polyurethane A and the polyolefin B were not bonded in the mold.

Example 11

An injection molded article having a flat plate shape was obtained by injection molding in the same manner as in Example 1 except that a mold (having a thickness of 10 mm) having a flat plate shape was used, and about 20 parts by weight of the polyolefin A ("DF640" manufactured by Mitsui Chemicals, Inc., SP value=7.7 to 8.4) as a resin for the inner member and about 80 parts by weight of the polyolefin B ("DF9200" manufactured by Mitsui Chemicals, Inc., SIP value=7.7 to 8.4) as a resin for the outer member were used. In the obtained injection molded article, the entire inner member composed of the polyolefin A was enclosed in the outer member composed of the polyolefin B in the area from the near end to around the center in the length direction of the injection molded product. Further, an area composed only of the outer member not enclosing the inner member extended from around the center to the tip side in the length direction of the injection molded product. Next, the injection molded article was sliced in the thickness direction so as to remove the outer member sandwiching the inner member respectively from the upper surface and the lower surface, to expose the inner member. A dumbbell test piece (type 5A with the total length of 75 mm and a thickness of 4 mm) defined in ISO 527-2 was cut out from the injection molded article in which the inner member was thus exposed. At this time, the dumbbell test piece was cut out so that the interface at which the different resins were joined to each other was located substantially at the center of a narrow parallel portion of the dumbbell test piece.

Example 12

A dumbbell test piece was cut out in the same manner as in Example 11 except that about 40 parts by weight of polyurethane ("ELASTOLLAN 1190" manufactured by BASF Japan Ltd., SP value=10.0 to 11.0) as a resin for the inner member and about 60 parts by weight of the polyolefin B ("DF9200" manufactured by Mitsui Chemicals, Inc., SP value=7.7 to 8.4) as a resin for the outer member were used.

Tensile Test

The break strength TB was measured for the dumbbell test pieces obtained by Examples 11 and 12 and Comparative Examples 1 and 2 by performing a tensile test in accordance with ISO 527-2 using "AG-IS 50kN" manufactured by SHIMADZU CORPORATION at a test speed of 300 mm/minute. Table 1 below shows the results.

TABLE 1

|  | Molding method | Resin | Break strength TB (MPa) |
|---|---|---|---|
| Comparative Example 1 | Overmolding | Polyolefin A/ Polyolefin B | 3.1 |
| Comparative Example 2 | Overmolding | Polyurethane/ Polyolefin B | Not bonded |
| Example 11 | Two-component injection molding | Polyolefin A/ Polyolefin B | 20.2 |
| Example 12 | Two-component injection molding | Polyurethane/ Polyolefin B | 4.3 |

As is obvious from Table 1, it is understood that the test pieces of Example 11 and 12 formed by two-component injection molding by the same method as in the shoe member of the present invention have high TB and excellent adhesion as compared to the test pieces of Comparative Examples 1 and 2 molded by overmolding. In particular, the polyurethane and the polyolefin B constituting the test piece of Example 11 have a difference in SP value therebetween of 1.6 or more and are generally recognized as resins that are difficult to bond directly to each other. Nevertheless, the break strength TB of the test piece of Example 11 is higher than the break strength TB of the test piece of Comparative Example 2 in which olefin materials are directly bonded to each other, since these two resins are mixed while they are melted. That is, in the shoe member of the present invention, resins having low adhesiveness with the difference in SP value of 1.6 or more can be directly bonded to each other with an adhesion equivalent to or higher than in the case where the same types of resins are directly bonded to each other by overmolding that can be commonly used for shoe members.

REFERENCE SIGNS LIST

1: Shoe,
3: Midsole,
4, 4': Outer sole
11: Inner member,
12: Outer member

The invention claimed is:

1. A shoe member constituting a part of a shoe, comprising
   an injection molded article that comprises an inner member and an outer member partially or fully enclosing the inner member, wherein
   the inner member and the outer member are each formed from a resin composition containing a thermoplastic resin, and
   the inner member and the outer member are directly bonded to each other via an interface at which the inner member and the outer member are compatibilized.

2. The shoe member according to claim 1, having a difference in SP value between the thermoplastic resin contained in the inner member and the thermoplastic resin contained in the outer member of 1.0 or more.

3. The shoe member according to claim 1, wherein
   the outer member has at least one opening, and
   the inner member includes an extending portion that extends through each of the at least one opening to the outside of the outer member.

4. The shoe member according to claim 1, wherein the inner member is a shock absorber.

5. The shoe member according to claim 4, wherein the shock absorber is a polymer gel.

6. The shoe member according to claim 1, wherein one or both of the inner member and the outer member are non-foamed products.

7. The shoe member according to claim 1, wherein one or both of the inner member and the outer member are foam products.

8. The shoe member according to claim 1, wherein the shoe member is an outer sole, a midsole, or a sock liner.

9. A shoe comprising:
   the shoe member according to claim 1.

10. A method for producing a shoe member constituting a part of a shoe,
   the shoe member comprising a composite that comprises an inner member and an outer member partially or fully enclosing the inner member,
   wherein the inner member and the outer member are directly bonded to each other via an interface at which the inner member and the outer member are compatibilized,
   the method comprising producing the composite by injection molding.

* * * * *